Figure 1:
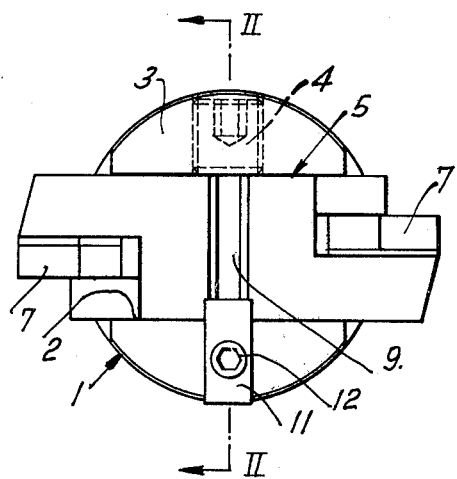

United States Patent [19]
Eckle

[11] 3,915,585  
[45] Oct. 28, 1975

[54] BORING BAR AND AN ELONGATED BORING BAR INSERT HAVING BORING TOOLS AT OPPOSITE ENDS

[75] Inventor: Otto Eckle, Lochgau, Germany

[73] Assignee: KOMET Stahlhalter-und Werkzeugfabrik, Robert Breuning GmbH, Besigheim, Germany

[22] Filed: Feb. 20, 1973

[21] Appl. No.: 333,484

[30] Foreign Application Priority Data

Feb. 29, 1972    Germany.......................... 2209516

[52] U.S. Cl. ............. 408/183; 408/232; 408/713; 29/97 R
[51] Int. Cl.²............... B23B 29/034; B23B 51/00
[58] Field of Search .......... 408/197, 153, 185, 186, 408/162, 179, 198, 231, 232, 239, 713, 157; 29/105 R, 97 R

[56] References Cited
UNITED STATES PATENTS

| | | | |
|---|---|---|---|
| 1,440,903 | 1/1923 | Bennett | 408/185 |
| 2,201,495 | 5/1940 | Miller | 408/153 |
| 2,371,127 | 3/1945 | Calhoun | 408/185 X |
| 3,363,485 | 1/1968 | Holloway | 408/153 |
| 3,455,188 | 7/1969 | Pratt et al. | 408/153 |
| 3,625,624 | 12/1971 | Fitzsimmons | 408/197 X |

*Primary Examiner*—Harrison L. Hinson  
*Assistant Examiner*—Z. R. Bilinsky  
*Attorney, Agent, or Firm*—Woodhams, Blanchard and Flynn

[57] ABSTRACT

A boring bar and drill stem insert for boring tools which are positioned at opposite ends thereof and has a transverse recess with a rectangular cross section opening toward the front face of the boring bar and extending at right angles to the axis of the boring bar to accept a drill stem insert of identical cross section. A clamping screw is provided at right angles to the transverse recess and is adapted to clamp the insert in the boring bar. A centering body, for centering the insert, engages a side face of the insert. A centering wedge is provided having a trapezoidal cross section and constitutes the centering body and is received partly in a groove in the front face of the boring bar insert. Both grooves are of a trapezoidal cross section and the wedge can be forced into the grooves by means of a screw extending in the axial direction of the boring bar.

6 Claims, 4 Drawing Figures

BORING BAR AND AN ELONGATED BORING BAR INSERT HAVING BORING TOOLS AT OPPOSITE ENDS

The invention relating to a boring bar and a drill stem insert having boring tools at both ends positioned at an angle of 180° to each other in which a transverse recess having a rectangular cross section opening towards the front side of the boring bar and running at right angles to the axis of the boring bar is provided to accept a boring bar insert of the same cross section and there are provided a clamping screw, for clamping the insert in the boring bar, and also a centering body, to center the insert, which engages having a side face of the insert and having the stem of boring bar.

In a boring bar of this type and a boring bar insert (from DT-OS 1 752 014) of a known type, a cylindrical pin is provided in the perpendicular side face of the transverse recess which engages with a groove in the rear side face of the boring bar insert. Although, in this known boring bar insert, the boring tool carrier which carries the boring tool can be adjusted very accurately to be counter-rotating, by means of an adjusting ring with a thread, the centering does not satisfy the highest demands for accuracy. It is not, for instance, possible, particularly when considering an exchange of the boring bar insert, to machine the recess in the side face of the insert which serves for centering so accurately that the cylindrical centering pin will engage without play in the centering recess on all the various boring bar inserts. Also, it is impossible to ensure that the square cut boring bar insert actually makes contact with its back face against the perpendicular side face of the transverse recess. In particular a displacement is possible when the clamping screw is tightened.

The basic object of the invention is to design a boring bar and a boring bar insert of the constructional type described in the introduction such that various boring bar inserts can be centered in boring bar quickly and without error with the highest accuracy.

This is achieved according to the invention in that a centering wedge with a trapezoidal cross section is provided as the centering body and engages partly with a groove of corresponding trapezoidal cross section in the front face of the boring bar and partly in a similar groove in the front side face of the boring bar insert and the said wedge an be forced into the grooves by means of a screw extending in the axial direction of the boring bar. By forcing the centering wedge against the side faces of the grooves with trapezoidal cross section it is ensured that the surfaces of the centering wedge lie fully against the side faces of the grooves. Any manufacturing tolerances are thus compensated and the boring bar insert is entered relative to the boring bar with the highest accuracy by means of the centering wedge. At the same time, by forcing the centering wedge against the groove in the boring bar insert, the latter is forced with its rear side face against the perpendicular side face of the recess, so that the axis of the boring bar insert runs exactly parallel to the axis of the boring bar. In this way, the accuracy of machining is further increased. It must, however, be particularly emphasised that with the high accuracy achieved the changing of the boring bar insert can be carried out especially quickly. This also allows an especially rational system of operation to be employed. Thus it is possible with one and the same boring bar, without having to dismount it from the machine spindle, to first employ a boring bar insert for the preliminary machining of a boring which has two boring tools for rough working and which is designed to be correspondingly stable. The boring tools may, preferably, be rigidly attached to these boring bar inserts. After the rough machining, other boring bar inserts with boring tools which can be adjusted for counter rotation for finishing, as is described in DT-OS 1 752 014, can be interchanged with the previously used boring bar insert. A working scheme of this kind can, however, only operate if the interchange of the tools can be carried out in a very short time with the highest accuracy. The interchange of boring bar inserts can thus, especially with large and heavy boring bar, be carried out considerably more easily and rapidly than when the whole boring bar has to be exchanged. The interchange of tools imposes less strain on the operators and the machine spindles are protected.

Further details and advantages are described in the following with reference to examples of realization illustrated in the drawing.

Figure 2:
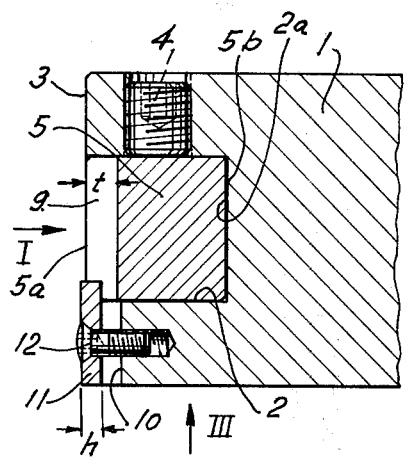

In the drawing:

FIG. 1 is a front view of the new boring bar having boring bar insert for rough machining, FIG. 2 is a section along the line II—II of FIG. 1, FIG. 3. is a view from below of the boring bar and the boring bar insert according to arrow 3 of FIG. 2, FIG. 4. is a front view of a boring bar with a boring bar insert for microfinish.

The boring bar has the reference number 1 in FIG. 1. Its rear end, not illustrated, is designed to be accepted in the spindle of the machine. The boring bar I has a transverse recess 2 with rectangular cross section at its front end. The transverse recess 2 runs at right angles to the axis A—A of the boring bar and is open towards the front face 3 of the boring bar. A clamping screw 4 is provided in the boring bar 1 in the neighborhood of the transverse recess 2 and at right angles to it. The boring bar inserts 5 and 6 are essentially of square cut design and have a rectangular cross section corresponding with the cross section of the transverse recess 2.

Figure 3:
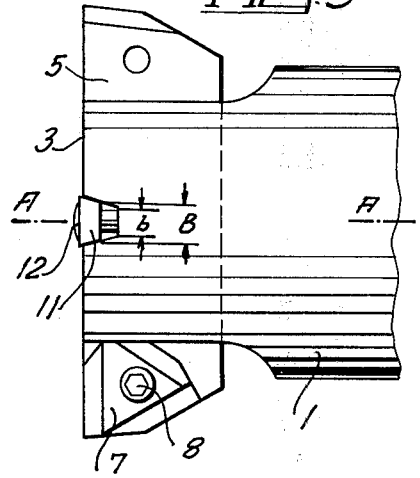

The boring bar insert according to FIGS. 1 to 3 serves for coarse or rough machining of the workpiece. It has two rigid, that is radial, non adjustable boring tools 7, which are armed with interchangeable multiple cutting cutting plates in a known manner and which can be attached to the cutting tool carrier 5 by means of holding screws 8.

A groove 9, with trapezoidal cross section, is provided in the front side surface 5a of the boring bar insert 5. A groove 10 with a geometrically similar cross section is arranged in the front face 3 of the boring bar 1. The grooves 9, 10, advantageously, run at right angles to the axis A—A of the drill stem and also at right angles to the boring bar insert 5.

A centering wedge 11 is further provided and has a cross section corresponding to that of the two grooves 9 and 10. In order that the application of the wedge surfaces of the centering wedge against the side surfaces of the grooves 9, 10 shall be always guaranteed, the height $h$ of the centering wedge is less than the depth $t$ of the grooves 9 and 10 and the breadth B of the base of the wedge is greater than the breadth $b$ of the bottom of the groove. It is thus ensured that the base of the wedge can never come into contact with the bottom of the groove.

A screw 12, extending in the axial direction of the boring bar, serves to hold the wedge in the grooves 9, 10 and to force it into them.

Conveniently, the groove 10 in the boring bar 1, with geometrically similar trapezoidal cross-section, is deeper by some 1/100ths of a mm than the groove 9 of the boring bar insert 5 or 6. It is thus ensured that, when the screw 12 is tightened, the centering wedge first comes into position with its wedge surfaces against the side faces of the groove 9 of the boring bar insert 5 or 6. Thus, on further tightening of the screw 12, the boring bar insert 5 or 6 is brought into position with its rear side surface 5b against the perpendicular side surface 2a of the transverse recess 2. On further tightening of the screw, the wedge aligns itself with its trapezoidal sides also against the side faces of the groove 10 in the boring bar and all play in the transverse direction is thus eliminated. In this way an extremely accurate position centering of the boring bar insert in the boring bar is achieved, which can be repeated as often as desired so that accuracies of exchange of the order of magnitude of a few mu can be observed. The clamping screw 4 is tightened after exact centering of the insert 5 or 6, so that the insert in question can no longer be displaced in any direction.

Figure 4:
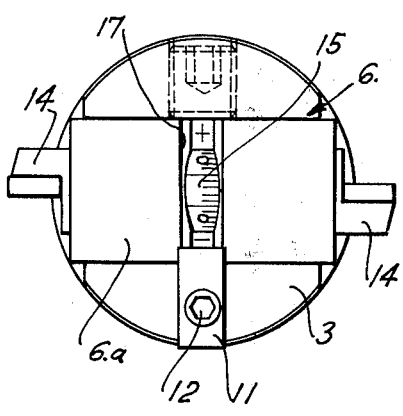

The boring bar insert shown in FIG. 4, with counter-rotating movable boring tool holders 14, is used for micro-finishing. Its construction is described in detail in DT-OS 1 752 014. An adjusting ring 15 serves for adjustment to the counter-rotating position, and is reached through a recess in the housing of the boring bar insert 6. This recess is convieniently constructed to serve at the same time as the groove 17 having a trapezoidal cross section for acceptance of the centering wedge 11. The boring tool carrier 14 of the boring bar insert 6 could be exactly adjusted to the desired cross section before insertion in the boring bar, for instance in the manufacture of the tool, so that after insertion of the boring bar insert 6 and centering of the same by means of the wedge 11 no further adjustment operations are necessary.

The design of the boring bar and the drill stem insert according to the invention has the further advantage that, if desired, two or more boring bar inserts 5 of different working cross sections can be inserted for rough working and these can be inserted in succession with a fine rotating tool for the final machining only. If the requirements for accuracy are less high rotating tools for prelimenary working only may be used. It is also important here that the transverse recess 2 opens towards the front end of the boring bar since in this way, on the one hand, a more rapid exchange of boring bar inserts is possible, and, on the other hand, the boring bar inserts are placed at the outermost end of the boring bar. It is thereby also made possible to machine the so called shoulder borings in which both boring tools come into operation.

In the place of one clamping screw, two clamping screws may, where necessary, be provided in the boring bar. The term "rectangular cross section" is here taken to include a square cross section when referring to the boring bar insert.

The embodiments of the invention in which an exclusive property or privilege is claimed are defined as follows:

1. The combination of a boring bar and an elongated boring bar insert, said boring bar having boring tools at opposite ends thereof positioned at an angle of 180° to each other, said boring bar having a first transverse recess with a rectangular cross section opening outwardly in an axial direction of said boring bar and extending at right angles to an axis of rotation of said boring bar and adapted to receive said boring bar insert therein, said boring bar insert having a rectangular cross section, a clamping screw on said boring bar extending at a right angle to and into said first transverse recess, a second transverse recess opening outwardly in said axial direction of said boring bar, a centering wedge having a trapezoidal cross section, said second transverse recess being partly defined by a groove in an axially facing surface of said boring bar and partly by a groove in an axially facing side face of said boring bar insert which is parallel to said axially facing surface on said boring bar, both of said grooves having a trapezoidal cross section, a screw extending in a direction parallel to said axis of said boring bar, an axis of said screw intersecting the longitudinal axis of said groove, a pair of oppositely facing surfaces on said trapezoidal shaped centering wedge engaging opposed surfaces in both of said trapezoidal shaped grooves, said oppositely facing surfaces of said centering wedge being forced into engagement with said opposed surfaces of both of said grooves by said screw.

2. The improvement according to claim 1, wherein said groove in said boring bar is deeper by some 1/100ths of a mm. than said groove in said boring bar insert, the trapezoidal cross section of said groove in said boring bar being the same as said groove in said boring bar.

3. The improvement according to claim 1, wherein said grooves in said boring bar and in said boring bar insert extend at right angles to said axis of rotation of said boring bar and at right angles to the axis of said transverse recess.

4. The improvement according to claim 1, wherein the height (h) of said centering wedge is less than the depth (t) of said grooves and the breadth (B) of the base of said centering wedge is greater than the breadth (b) of the bottom of said grooves.

5. The improvement according to claim 1, wherein said boring tools are mounted on said boring bar insert and includes adjusting ring means for adjusting said boring tools to be counter rotating and wherein said adjusting ring means is accessable through said groove provided in the center of said boring bar insert, said groove extending across the entire axially facing side face of said boring bar insert and serves at the same time for receiving said centering wedge.

6. The improvement according to claim 1, wherein both of said boring tools are fixed rigidly to said boring bar insert and being interchangeable multi-cutting cutting plates.

* * * * *